(12) United States Patent
Zhang et al.

(10) Patent No.: US 10,142,845 B2
(45) Date of Patent: Nov. 27, 2018

(54) NETWORK CONNECTION METHOD AND APPARATUS, AND COMPUTER STORAGE MEDIUM

(71) Applicant: Tencent Technology (Shenzhen) Company Limited, Shenzhen (CN)

(72) Inventors: Feng Zhang, Shenzhen (CN); Yun Ma, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/013,803

(22) Filed: Jun. 20, 2018

(65) Prior Publication Data

US 2018/0302792 A1 Oct. 18, 2018

Related U.S. Application Data

(63) Continuation-in-part of application No. PCT/CN2017/074156, filed on Feb. 20, 2017.

(30) Foreign Application Priority Data

Feb. 18, 2016 (CN) .......................... 2016 1 0089921

(51) Int. Cl.
*H04M 1/66* (2006.01)
*H04W 12/08* (2009.01)
(Continued)

(52) U.S. Cl.
CPC ........... *H04W 12/08* (2013.01); *H04L 63/083* (2013.01); *H04L 63/0853* (2013.01); *H04W 12/06* (2013.01); *H04W 76/11* (2018.02)

(58) Field of Classification Search
CPC ..... H04W 12/08; H04W 12/06; H04W 76/11; H04W 76/12; H04W 84/12; H04W 76/10;
(Continued)

(56) References Cited

U.S. PATENT DOCUMENTS 7,702,739 B1 * 4/2010 Cheng ..................... H04L 47/10
709/203
2009/0064283 A1 * 3/2009 Chen ..................... H04L 63/083
726/4
(Continued)

FOREIGN PATENT DOCUMENTS

CN 104427501 A * 3/2015 ............ H04W 12/04
CN 104717218 A * 6/2015
(Continued)

OTHER PUBLICATIONS

Tencent Technology, ISR, PCT/CN2017/074156, dated Mar. 29, 2017, 2 pgs.

*Primary Examiner* — Mahendra Patel
(74) *Attorney, Agent, or Firm* — Morgan, Lewis & Bockius LLP

(57) ABSTRACT

The present disclosure discloses a network connection method performed by a mobile terminal. The mobile terminal acquires a graphic code on a user-specified intelligent device after receiving a graphic code recognition instruction. The mobile terminal then displays a network connection interface based on the acquired graphic code for configuring a target wireless access point identifier and a target wireless access point password. After receiving a configuration completion instruction through the network connection interface, the mobile terminal sends a user-specified intelligent device identifier, a user-specified target wireless access point identifier, and a user-specified target wireless access point password to a server, so that the user-specified intelligent device can establish a network connection to a target wireless access point. In the present disclosure, the network connection to the target wireless access point is established
(Continued)

without the user-specified intelligent device entering a monitoring mode, thereby improving the efficiency of the network connection.

20 Claims, 9 Drawing Sheets

(51) Int. Cl.
*H04W 12/06* (2009.01)
*H04L 29/06* (2006.01)
*H04W 76/11* (2018.01)

(58) Field of Classification Search
CPC .... H04W 8/18; H04L 63/0853; H04L 63/083; H04L 67/06; H04L 67/2847; H04L 67/2842; H04L 63/0492; H04L 63/0846
USPC .............. 455/411, 445; 370/353; 379/221.11
See application file for complete search history.

(56) References Cited

U.S. PATENT DOCUMENTS

| | | | |
|---|---|---|---|
| 2009/0197571 A1* | 8/2009 | Kitajima | H04W 12/06 455/411 |
| 2010/0293250 A1* | 11/2010 | Ankaiah | H04L 12/56 709/219 |
| 2011/0026436 A1* | 2/2011 | Karaoguz | H04L 12/2803 370/254 |
| 2013/0223279 A1* | 8/2013 | Tinnakornsrisuphap | H04L 41/0809 370/254 |
| 2014/0050167 A1* | 2/2014 | Smedman | H04W 48/14 370/329 |
| 2014/0162600 A1* | 6/2014 | Chang | H04W 12/06 455/411 |
| 2014/0282960 A1* | 9/2014 | Tinnakornsrisuphap | H04L 63/083 726/7 |
| 2015/0072653 A1* | 3/2015 | Fan | H04W 12/08 455/411 |

FOREIGN PATENT DOCUMENTS

| | | | |
|---|---|---|---|
| CN | 104780087 A | | 7/2015 |
| CN | 104980919 A | * | 10/2015 |
| CN | 105050162 A | | 11/2015 |
| CN | 105120456 A | * | 12/2015 |
| CN | 105142135 A | | 12/2015 |
| CN | 105187433 A | * | 12/2015 |
| CN | 105260695 A | * | 1/2016 |
| CN | 105306264 A | | 2/2016 |
| WO | WO 2015035795 A1 | * | 3/2015 ............ H04W 12/04 |
| WO | WO 2017107550 A1 | * | 6/2017 ............ H04W 48/20 |

* cited by examiner

Network connection interface

Specified access point identifier: X    Specified access point password: Y

Target access point identifier: ☐    Target access point password: ☐

NETWORK CONNECTION METHOD AND APPARATUS, AND COMPUTER STORAGE MEDIUM

PRIORITY CLAIM AND RELATED APPLICATION

This application is a continuation-in-part application of PCT/CN2017/074156, entitled "NETWORK CONNECTION METHOD AND APPARATUS, AND COMPUTER STORAGE MEDIUM" filed on Feb. 20, 2017, which claims priority to Chinese Patent Application No. 201610089921.9, filed with the State Intellectual Property Office of the People's Republic of China on Feb. 18, 2016, and entitled "NETWORK CONNECTION METHOD AND APPARATUS, AND COMPUTER STORAGE MEDIUM", all of which are incorporated herein by reference in their entirety.

FIELD OF THE TECHNOLOGY

The present disclosure relates to the field of the Internet of Things, and in particular, to a network connection method and apparatus and a computer storage medium.

BACKGROUND OF THE DISCLOSURE

With the development of science and technologies, the Internet of Things technology is becoming increasingly mature. Intelligent devices based on the Internet of Things increasingly appear, such as intelligent televisions, intelligent air conditioners, and intelligent cameras. These intelligent devices need to connect to a network to make maximum use of their functions.

Currently, a network connection method for an intelligent device without a user input operation interface, such as an intelligent camera, usually is: when a configuration terminal with the operation interface connects to the network by using a wireless router, the configuration terminal may communicate with the wireless router, and communication data between the configuration terminal and the wireless router includes a service set identifier (SSID) and a password of the wireless router. When an intelligent device establishes a network connection, the intelligent device may turn on a monitoring mode to monitor the communication data between the configuration terminal and the wireless router by using a built-in Wireless Fidelity (WiFi) chip and acquire the SSID and the password of the wireless router from the monitored communication data. Next, the intelligent device switches the monitoring mode to an ordinary mode and establishes the network connection based on the SSID and the password of the wireless router.

In a process of implementing the present disclosure, it is found that the existing technology at least has the following problems:

When an intelligent device is in the monitoring mode, cyclic redundancy check is not performed on the communication data acquired by the intelligent device. Therefore, the received communication data may be incomplete or incorrect, resulting in that the acquired SSID and password are usually wrong, consequently reducing the accuracy of the network connection.

SUMMARY

To resolve the problem in the existing technology, embodiments of the present application provide a network connection method and apparatus and a computer storage medium. The technical solutions are as follows:

According to a first aspect of the present application, a network connection method is performed by a mobile terminal having one or more processors and memory storing a plurality of programs to be executed by the one or more processors, the method comprising:

acquiring, by the mobile terminal, a graphic code on a user-specified intelligent device after receiving a graphic code recognition instruction, the user-specified intelligent device being a device to connect to a target wireless access point;

displaying, by the mobile terminal, a network connection interface based on the acquired graphic code, the network connection interface being used for configuring a target wireless access point identifier and a target wireless access point password;

receiving, by the mobile terminal, a configuration completion instruction through the network connection interface, the configuration completion instruction including a user-specified target wireless access point identifier and a user-specified target wireless access point password; and sending, by the mobile terminal, a user-specified intelligent device identifier, the user-specified target wireless access point identifier, and the user-specified target wireless access point password to a server, so that the user-specified intelligent device acquires the user-specified target wireless access point identifier and the user-specified target wireless access point password from the server and establishes a network connection to the target wireless access point.

According to a second aspect of the present application, a mobile terminal is used for establishing a wireless network connection, the mobile terminal comprising one or more processors, memory coupled to the one or more processors, and a plurality of programs stored in the memory that, when executed by the one or more processors, cause the mobile terminal to perform the aforementioned network connection method.

According to a third aspect of the present application, a non-transitory computer readable storage medium stores a plurality of programs that, when executed by one or more processors of a mobile terminal, cause the mobile terminal to perform the aforementioned network connection method.

The technical solutions provided in the embodiments of the present application have the following beneficial effects: in the embodiments of the present application, when displaying the network connection interface based on the acquired graphic code, a configuration terminal may receive settings of the target wireless access point identifier and the target wireless access point password based on the network connection interface, and send the user-specified intelligent device identifier, the user-specified target wireless access point identifier, and the user-specified target wireless access point password to the server, so that the user-specified intelligent device may acquire the target wireless access point identifier and the target wireless access point password from the server and complete the network connection to the target wireless access point without turning on a monitoring mode, thereby improving the accuracy of the network connection established by the user-specified intelligent device.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show merely some embodiments of the present application, and a person of ordinary skill in the technology may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Before embodiments of the present application are described in detail, an application scenario of the embodiments of the present application is illustrated. More intelligent devices such as intelligent cameras and intelligent sounders can establish a network connection due to the rapid development of the Internet of Things. An intelligent device with an operation interface can easily establish a network connection. However, for an intelligent device without the operation interface, establishing the network connection is relatively complex. For example, when the intelligent device without the operation interface establishes a network connection, a configuration terminal with the operation interface needs to establish a network connection first, and then the intelligent device performs monitoring by using a built-in WiFi chip. When communication data between the configuration terminal and a wireless router is monitored, an SSID and a password of the wireless router can be acquired from the communication data and the network connection is established based on the SSID and the password. The communication data monitored by the intelligent device may be incomplete or incorrect, resulting in that the acquired SSID and the password of the wireless router are usually wrong, consequently reducing the accuracy of the network connection. Therefore, embodiments of this disclosure provide a network connection method that can improve the accuracy of the network connection.

Figure 1:
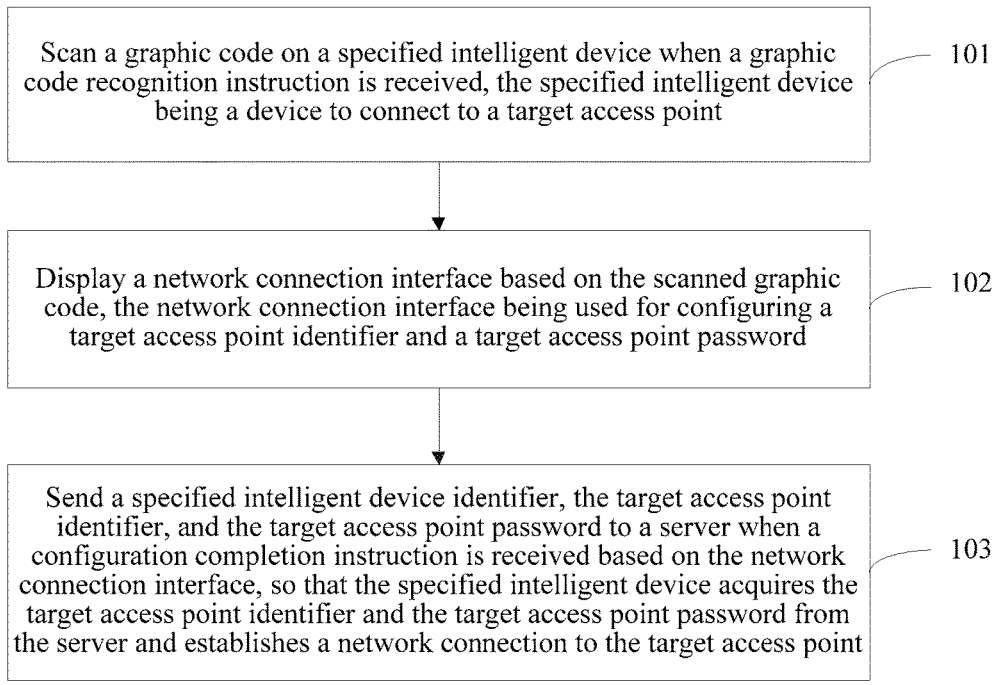
FIG. 1 is a flowchart of a network connection method according to some embodiments of the present application.

FIG. 1 is a flowchart of a network connection method performed by a mobile terminal according to some embodiments of the present application. Referring to FIG. 1, the method includes:

Step 101: Scan a graphic code on a user-specified intelligent device after receiving a graphic code recognition instruction, the user-specified intelligent device being a device to connect to a target wireless access point.

Step 102: Display a network connection interface based on the acquired graphic code, the network connection interface being used for configuring a target wireless access point identifier and a target wireless access point password.

Step 103: Send a user-specified intelligent device identifier, the user-specified target wireless access point identifier, and the user-specified target wireless access point password to a server after receiving a configuration completion instruction based on the network connection interface, so that the user-specified intelligent device acquires the user-specified target wireless access point identifier and the user-specified target wireless access point password from the server and establishes a network connection to the target wireless access point. In some embodiments, the mobile terminal also sends the user-specified target wireless access point identifier and the user-specified target wireless access point password to the user-specified intelligent device.

In this embodiment of the present application, when displaying the network connection interface based on the acquired graphic code, a configuration terminal may receive settings of the target wireless access point identifier and the target wireless access point password based on the network connection interface, and send the user-specified intelligent device identifier, the user-specified target wireless access point identifier, and the user-specified target wireless access point password to the server, so that the user-specified intelligent device may acquire the target wireless access point identifier and the target wireless access point password from the server and complete the network connection to the target wireless access point without turning on a monitoring mode, thereby improving the accuracy of the network connection established by the user-specified intelligent device.

In a specific implementation, after the displaying a network connection interface based on the acquired graphic code, the method further includes:

determining whether a hotspot is currently turned on;

determining whether intelligent devices currently connected to the hotspot include the user-specified intelligent device if the hotspot is turned on;

acquiring a default wireless access point identifier and a default wireless access point password from the network connection interface if the user-specified intelligent device is not included, where the default wireless access point identifier is a wireless access point identifier built in the user-specified intelligent device and the default wireless access point password is a password corresponding to the default wireless access point identifier; and setting a hotspot identifier for the hotspot using the default wireless access point identifier and setting a hotspot password for the hotspot using the default wireless access point password.

In a specific implementation, after the displaying a network connection interface based on the acquired graphic code, the method further includes:

displaying a hotspot setting interface when a hotspot setting instruction is received;

turning on a hotspot after receiving a hotspot turn-on instruction based on the hotspot setting interface; and setting a hotspot identifier for the hotspot to the default wireless access point identifier and setting a hotspot password for the hotspot to the default wireless access point password when the default wireless access point identifier and the default wireless access point password are detected from the hotspot setting interface.

In a specific implementation, after the sending a user-specified intelligent device identifier, the user-specified target wireless access point identifier, and the user-specified target wireless access point password to a server, the method further includes:

displaying prompt information of a connection failure after receiving connection failure information from the server, where the connection failure information is used for prompting that the user-specified intelligent device fails to connect to the target wireless access point.

In a specific implementation, the user-specified intelligent device is an intelligent device without a user input operation interface.

All optional technical solutions above may be combined in any manner to form optional embodiments of the present application. Details of this embodiment of the present application are not described herein.

Figure 2:
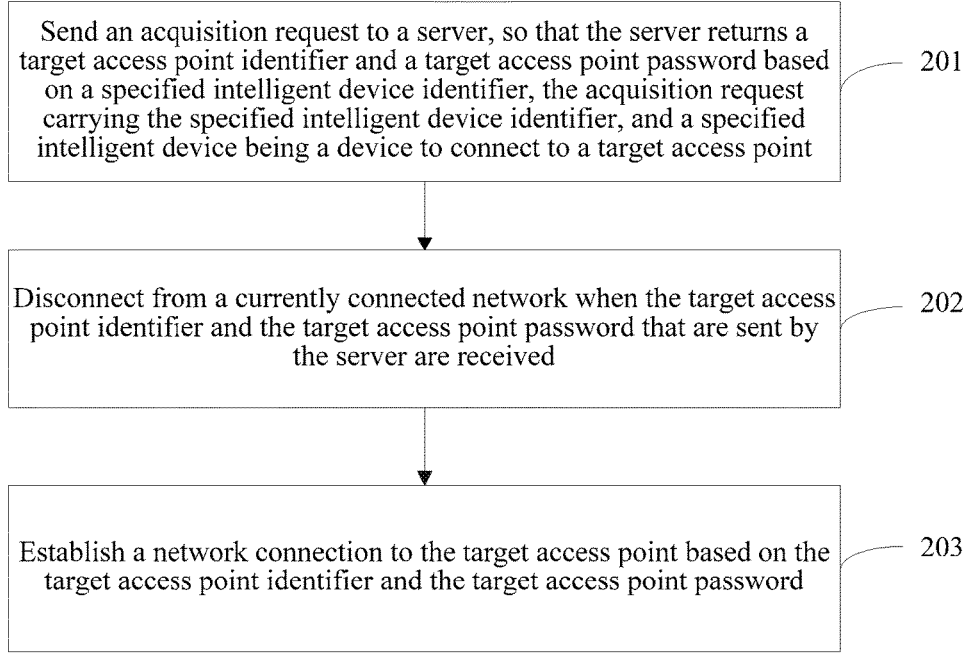
FIG. 2 is a flowchart of another network connection method according to some embodiments of the present application.

FIG. 2 is a flowchart of another network connection method according to some embodiments of the present application. Referring to FIG. 2, the method includes:

Step 201: Send an acquisition request to a server, so that the server returns a target wireless access point identifier and a target wireless access point password based on a user-specified intelligent device identifier, the acquisition request carrying the user-specified intelligent device identifier, and a user-specified intelligent device being a device to connect to a target wireless access point.

Step 202: Disconnect from a currently connected network when the target wireless access point identifier and the target wireless access point password that are sent by the server are received.

Step 203: Establish a network connection to the target wireless access point based on the target wireless access point identifier and the target wireless access point password.

In this embodiment of the present application, the user-specified intelligent device may send the acquisition request to the server to acquire the target wireless access point identifier and the target wireless access point password from the server and establish the network connection to the target wireless access point based on the target wireless access point identifier and the target wireless access point password without turning on a monitoring mode, thereby improving the accuracy of the network connection established by the user-specified intelligent device. Moreover, in this embodiment of the present application, the user-specified intelligent device does not need to switch between the monitoring mode and an ordinary mode, an operation is easy, and a requirement on a configuration of the user-specified intelligent device is relatively low, thereby improving an adaptation range of the network connection.

In a specific implementation, before the sending an acquisition request to a server, the method further includes:

determining whether a network is connected currently; and establishing the network connection based on a default wireless access point identifier and a default wireless access point password if the network is not connected currently, where the default wireless access point identifier is a built-in wireless access point identifier and the default wireless access point password is a password corresponding to the default wireless access point identifier.

In a specific implementation, the currently connected network includes a hotspot network of a configuration terminal.

In a specific implementation, after the establishing a network connection to the target wireless access point based on the target wireless access point identifier and the target wireless access point password, the method further includes:

sending prompt information of a connection failure to the server when the network connection to the target wireless access point fails, so that the server sends the prompt information of the connection failure to a configuration terminal.

All optional technical solutions above may be combined in any manner to form optional embodiments of the present application. Details of this embodiment of the present application are not described herein.

Figure 3:
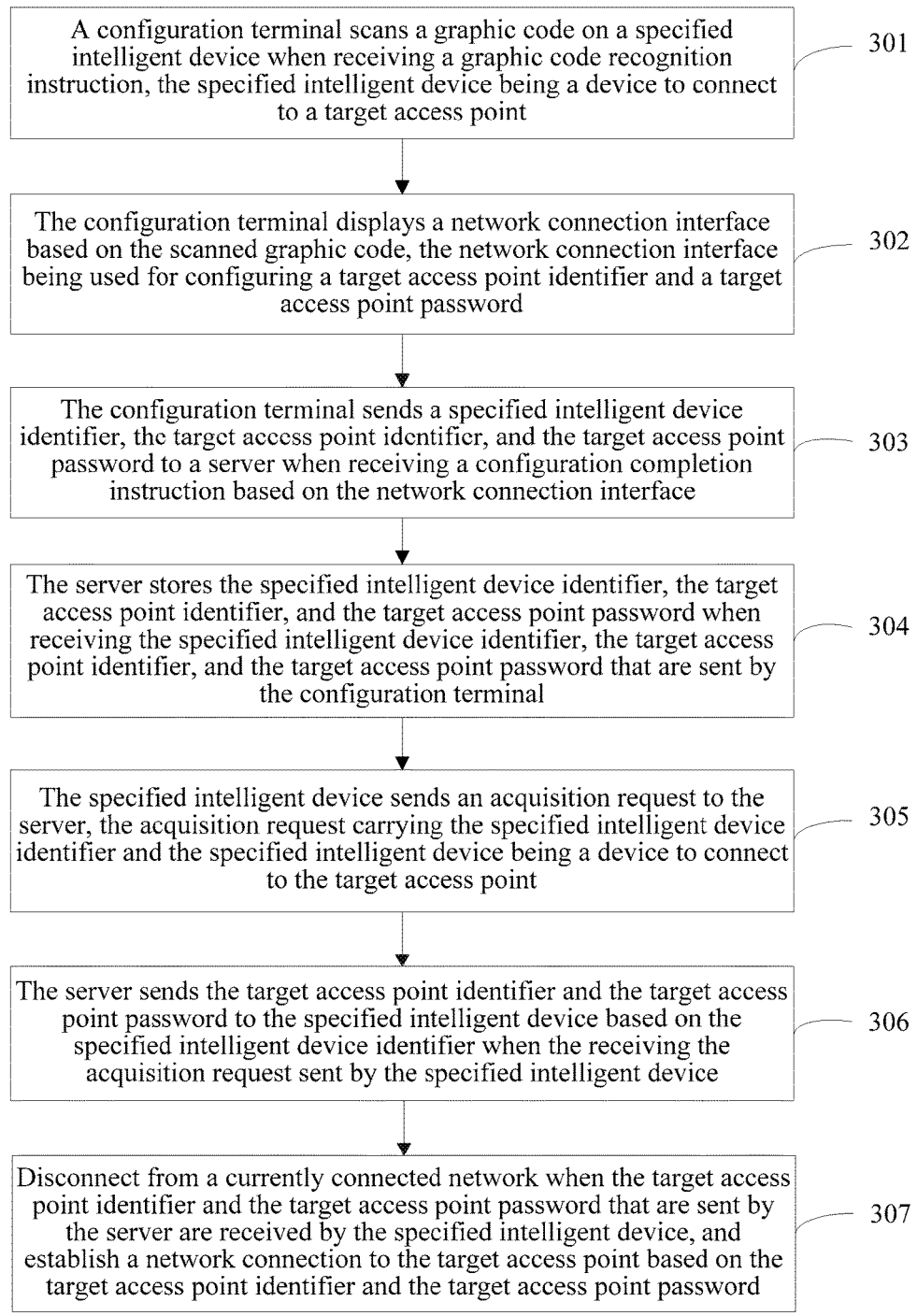
FIG. 3 is a flowchart of another network connection method according to some embodiments of the present application.

FIG. 3 is a flowchart of a network connection method according to some embodiments of the present application. Referring to FIG. 3, the method includes:

Step 301: A configuration terminal scans a graphic code on a user-specified intelligent device when receiving a graphic code recognition instruction, the user-specified intelligent device being a device to connect to a target wireless access point.

The graphic code on the user-specified intelligent device may include network connection information of the user-specified intelligent device. Therefore, the configuration terminal may recognize the graphic code of the user-specified intelligent device to acquire the network connection information of the user-specified intelligent device.

It should be noted that the graphic code recognition instruction is used for recognizing the graphic code. In addition, the graphic code recognition instruction may be triggered by a user through a user-specified operation. The user-specified operation may be a clicking operation, a sliding operation, or a voice operation, which is not specifically limited in this embodiment of the present application.

In addition, the graphic code is used for uniquely identifying the user-specified intelligent device. The graphic code may be a two-dimensional code or a barcode, which is not specifically limited in this embodiment of the present application.

It should be further noted that the user-specified intelligent device may be an intelligent device without a user input operation interface. For example, the user-specified intelligent device may be an intelligent camera or an intelligent sounder. Certainly, in this embodiment of the present application, the user-specified intelligent device may further be a device with an operation interface, which is not specifically limited in this embodiment of the present application.

In addition, in this embodiment of the present application, the configuration terminal may be a smartphone, a laptop, or the like, which is not specifically limited in this embodiment of the present application either.

Step 302: The configuration terminal displays a network connection interface based on the acquired graphic code, the network connection interface being used for configuring a target wireless access point identifier and a target wireless access point password.

The configuration terminal may acquire graphic code information from the acquired graphic code and display the network connection interface based on the graphic code information.

It should be noted that for a method for displaying the network connection interface based on the graphic code information, reference may be made to related technologies, and details are not described in this embodiment of the present application.

It should be further noted that the target wireless access point identifier is used for uniquely identifying the target wireless access point, and the target wireless access point identifier may be configured by the user based on the network connection interface, which is not specifically limited in this embodiment of the present application. The target wireless access point password is a password corresponding to the target wireless access point, and the target wireless access point password may also be configured by the user based on the network connection interface, which is not specifically limited in this embodiment of the present application either.

In addition, the network connection interface is used for indicating an operation of a network connection. The network connection interface may include an wireless access point identifier built in the user-specified intelligent device, an wireless access point password corresponding to the wireless access point identifier, a target wireless access point identifier input box, and a target wireless access point password input box, which is not specifically limited in this embodiment of the present application.

It should be noted that in this embodiment of the present application, for ease of description, the wireless access point identifier built in the user-specified intelligent device may be referred to as a default wireless access point identifier, and the wireless access point password built in the user-specified intelligent device may be referred to as a default wireless access point password.

Figures 4, 5:
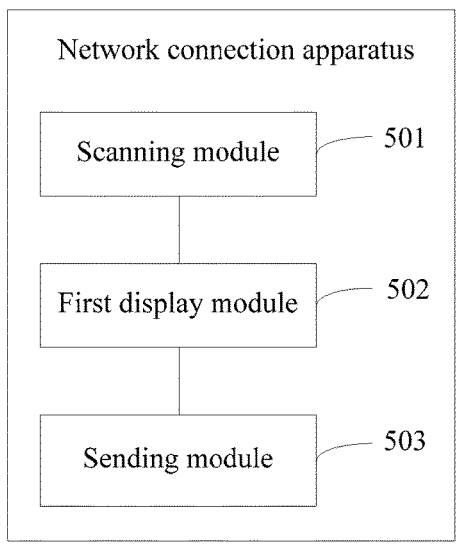
FIG. 4 is a schematic diagram of a network connection interface according to some embodiments of the present application.
FIG. 5 is a schematic structural diagram of a first network connection apparatus according to some embodiments of the present application.

For example, the configuration terminal may display, based on the acquired graphic code, a network connection interface shown in FIG. 4. In FIG. 4, the network connection interface includes a default wireless access point identifier X, a default wireless access point password Y, a target wireless access point identifier input box, and a target wireless access point password input box.

In addition, the configuration terminal not only can display the network connection interface based on the acquired graphic code but also can acquire information from the graphic code, such as user-specified intelligent device identifier, which is not specifically limited in this embodiment of the present application.

It should be noted that the user-specified intelligent device identifier is used for uniquely identifying the user-specified intelligent device. For example, the user-specified intelligent device identifier may be a factory serial number or a Media Access Control (MAC) address of the user-specified intelligent device, which is not specifically limited in this embodiment of the present application.

Further, after displaying the network connection interface based on the acquired graphic code, the configuration terminal may further determine whether a hotspot is currently turned on, so that the user-specified intelligent device connects to a network by using the built-in wireless access point identifier and wireless access point password. The configuration terminal determines whether intelligent devices currently connected to the hotspot include the user-specified intelligent device if the hotspot is turned on. The configuration terminal acquires a default wireless access point identifier and a default wireless access point password from the network connection interface if the user-specified intelligent device is not included, where the default wireless access point identifier is a wireless access point identifier built in the user-specified intelligent device and the default wireless access point password is a password corresponding to the default wireless access point identifier. A hotspot identifier of the hotspot of the configuration terminal is set to the default wireless access point identifier and a hotspot password of the hotspot is set to the default wireless access point password.

The operation that the configuration terminal determines whether the intelligent devices currently connected to the hotspot include the user-specified intelligent device may be: the configuration terminal acquires the user-specified intelligent device identifier and identifiers of multiple intelligent devices currently connected to the hotspot at the same time, compares the acquired user-specified intelligent device identifier with the identifiers of the multiple intelligent device, and determines that the intelligent devices currently connected to the hotspot do not include the user-specified intelligent device when the identifiers of the multiple intelligent devices do not include the user-specified intelligent device identifier, or otherwise, determines that the intelligent devices currently connected to the hotspot include the user-specified intelligent device.

It should be noted that the hotspot is a transmission point spreading a WiFi signal after a network signal of a network connected by the configuration terminal is converted into the WiFi signal. Further, the network signal of the network connected by the configuration terminal may be a mobile data network, a wired bandwidth network, or the like. The mobile data network may be a general packet radio service (GPRS) or the like, which is not specifically limited in this embodiment of the present application.

Moreover, for the operation that the configuration terminal acquires the default wireless access point identifier and the default wireless access point password from the network connection interface, reference may be made to related technologies, and details are not described in this embodiment of the present application. For the operation that the configuration terminal sets the hotspot identifier of the hotspot to the default wireless access point identifier and sets the hotspot password of the hotspot to the default wireless access point password, reference may also be made to related technologies, which is not described this embodiment of the present application either.

In a specific implementation, after the configuration terminal displays the network connection interface based on the acquired graphic code, the hotspot of the configuration terminal not only can be set according to the foregoing method and other methods, but also can be set in other manners. For example, the configuration terminal displays a hotspot setting interface when receiving a hotspot setting instruction, The configuration terminal turns on the hotspot when receiving a hotspot turn-on instruction based on the hotspot setting interface. The configuration terminal sets the hotspot identifier of the hotspot to the default wireless access point identifier and sets the hotspot password of the hotspot to the default wireless access point password when detecting the default wireless access point identifier and the default wireless access point password from the hotspot setting interface.

It should be noted that the hotspot setting instruction is used for setting the hotspot of the configuration terminal. In addition, the hotspot setting instruction may be triggered by a user through a user-specified operation, which is not specifically limited in this embodiment of the present application. The hotspot turn-on instruction is used for turning on the hotspot of the configuration terminal. In addition, the hotspot turn-on instruction can also be triggered by the user through a user-specified operation, which is not specifically limited in this embodiment of the present application.

Step 303: The configuration terminal sends the user-specified intelligent device identifier, the user-specified target wireless access point identifier, and the user-specified target wireless access point password to a server when receiving a configuration completion instruction based on the network connection interface.

It should be noted that the configuration completion instruction is used for determining that the configuration terminal completes configuration of the target wireless access point identifier and the target wireless access point password based on the network connection interface. The configuration completion instruction may be triggered by a user through a user-specified operation, which is not specifically limited in this embodiment of the present application.

Further, the configuration terminal displays prompt information of a connection failure when receiving connection failure information sent by the server, where the connection failure information is used for prompting that the user-specified intelligent device fails to connect to the target wireless access point.

When receiving the connection failure information, the configuration terminal can re-perform step 302.

Step 304: The server stores the user-specified intelligent device identifier, the user-specified target wireless access point identifier, and the user-specified target wireless access point password when receiving the user-specified intelligent device identifier, the user-specified target wireless access point identifier, and the user-specified target wireless access point password that are sent by the configuration terminal.

The server may store the user-specified intelligent device identifier, the user-specified target wireless access point identifier, and the user-specified target wireless access point password in a correspondence among an intelligent device identifier, an wireless access point identifier, and an wireless access point password, which is not specifically limited in this embodiment of the present application.

After the configuration terminal sends the target wireless access point identifier and the target wireless access point password to the server based on the foregoing step, the user-specified intelligent device may acquire the target wireless access point identifier and the target wireless access point password by means of the following step, to establish a network connection to the target wireless access point.

Step 305: The user-specified intelligent device sends an acquisition request to the server, the acquisition request carrying the user-specified intelligent device identifier and the user-specified intelligent device being a device to connect to the target wireless access point.

It should be noted that the acquisition request is used for acquiring the target wireless access point identifier and the target wireless access point password.

Further, before sending the acquisition request to the server, the user-specified intelligent device can further determine whether a network is connected currently; and establishes a network connection based on the default wireless access point identifier and the default wireless access point password if the network is not connected currently.

When the user-specified intelligent device currently connects to the network, the network currently connected by the user-specified intelligent device may be a hotspot network of the configuration terminal. Certainly, the network currently connected by the user-specified intelligent device may further be other networks, which is not specifically limited in this embodiment of the present application.

It should be noted that the hotspot network of the configuration terminal is a network corresponding to a WiFi signal spread by the configuration terminal by using the hotspot.

Step 306: The server sends the target wireless access point identifier and the target wireless access point password to the user-specified intelligent device based on the user-specified intelligent device identifier when receiving the acquisition request sent by the user-specified intelligent device.

Specifically, when receiving the acquisition request sent by the user-specified intelligent device, the server may acquire a corresponding wireless access point identifier and wireless access point password from the stored correspondence among the intelligent device identifier, the wireless access point identifier, and the wireless access point password based on the user-specified intelligent device identifier, determines the acquired wireless access point identifier as the target wireless access point identifier, determines the acquired wireless access point password as the target wireless access point password, and sends the target wireless access point identifier and the target wireless access point password to the user-specified intelligent device.

In addition, in this embodiment of the present application, the target wireless access point identifier and the target wireless access point password not only can be acquired by using the user-specified intelligent device identifier, but also can be acquired in other manners. For example, when the wireless access point identifier and the wireless access point password in each intelligent device are unique, the user-specified intelligent device identifier in this embodiment of the present application may be replaced by the default wireless access point identifier and the default wireless access point password, which is not specifically limited in this embodiment of the present application.

Step 307: Disconnect from the currently connected network when the target wireless access point identifier and the target wireless access point password that are sent by the server are received by the user-specified intelligent device, and establish the network connection to the target wireless access point based on the target wireless access point identifier and the target wireless access point password.

One device can connect only to one network at one time. Therefore, when receiving the target wireless access point identifier and the target wireless access point password that are sent by the server, the user-specified intelligent device can disconnect from the currently connected network to establish the network connection to the target wireless access point.

It should be noted that for the operation that the user-specified intelligent device establishes the network connection to the target wireless access point based on the target wireless access point identifier and the target wireless access point password, reference may be made to related technologies, and details are not described in this embodiment of the present application.

Further, the user-specified intelligent device may send prompt information of a connection failure to the server when the network connection to the target wireless access point fails, so that the server sends the prompt information of the connection failure to a configuration terminal.

In this embodiment of the present application, the configuration terminal may acquire the default wireless access point identifier and the default wireless access point password by using the graphic code of the user-specified intelligent device and set the hotspot of the configuration terminal based on the default wireless access point identifier and the default wireless access point password, to ensure that the user-specified intelligent device can connect to the hotspot network of the configuration terminal. In addition, the configuration terminal may further send the target wireless access point identifier and the target wireless access point password to the server by using the graphic code of the user-specified intelligent device. Later, the user-specified intelligent device may acquire the target wireless access point identifier and the target wireless access point password from the server and establish the network connection to the target wireless access point based on the target wireless access point identifier and the target wireless access point password without turning on a monitoring mode, thereby improving the accuracy of the network connection established by the user-specified intelligent device. Moreover, in this embodiment of the present application, the user-specified intelligent device does not need to switch between the monitoring mode and an ordinary mode, an operation is easy and a requirement on a configuration of the user-specified intelligent device is relatively low, thereby improving an adaptation range of the network connection.

FIG. 5 is a schematic diagram of a network connection apparatus according to some embodiments of the present application. Referring to FIG. 5, the apparatus includes a scanning module 501, a first display module 502, and a sending module 503.

The scanning module 501 is configured to scan a graphic code on a user-specified intelligent device after receiving a graphic code recognition instruction, the user-specified intelligent device being a device to connect to a target wireless access point.

The first display module 502 is configured to display a network connection interface based on the acquired graphic code, the network connection interface being used for configuring a target wireless access point identifier and a target wireless access point password.

The sending module 503 is configured to send a user-specified intelligent device identifier, the user-specified target wireless access point identifier, and the user-specified target wireless access point password to a server after receiving a configuration completion instruction based on the network connection interface, so that the user-specified intelligent device acquires the user-specified target wireless access point identifier and the user-specified target wireless access point password from the server and establishes a network connection to the target wireless access point.

Figure 6:
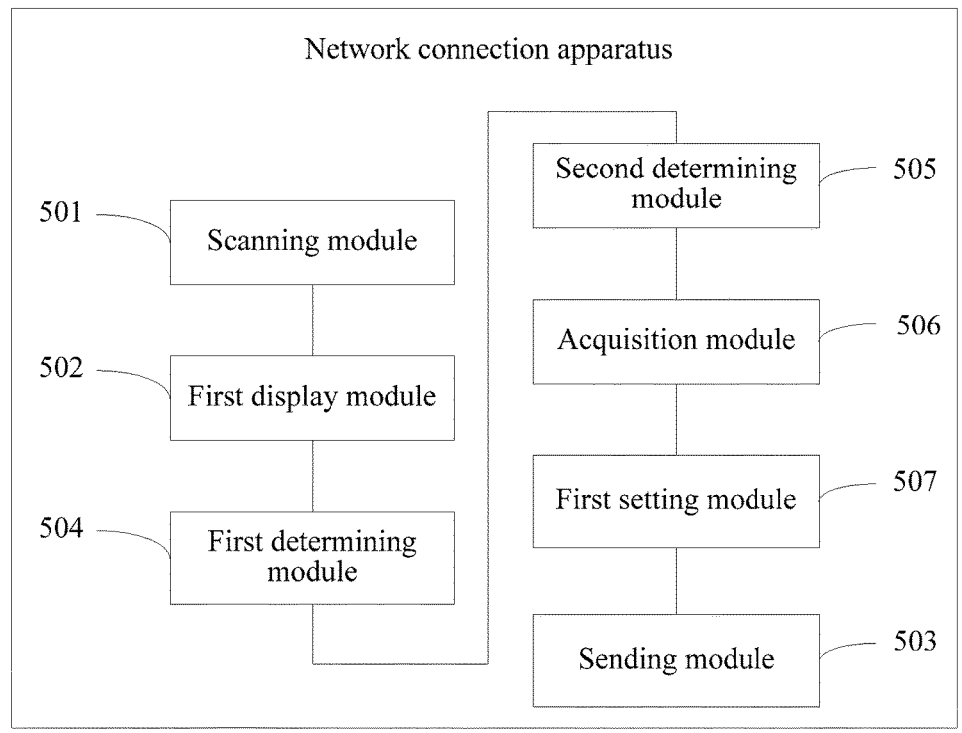
FIG. 6 is a schematic structural diagram of a second network connection apparatus according to some embodiments of the present application.

In a specific implementation, referring to FIG. 6, the apparatus further includes:

a first determining module 504, configured to determine whether a hotspot is currently turned on;

a second determining module 505, configured to determine whether intelligent devices currently connected to the hotspot include the user-specified intelligent device if the hotspot is turned on;

an acquisition module 506, configured to acquire a default wireless access point identifier and a default wireless access point password from the network connection interface if the user-specified intelligent device is not included, where the default wireless access point identifier is a wireless access point identifier built in the user-specified intelligent device and the default wireless access point password is a password corresponding to the default wireless access point identifier; and a first setting module 507, configured to set a hotspot identifier for the hotspot using the default wireless access point identifier and set a hotspot password for the hotspot using the default wireless access point password.

Figure 7:
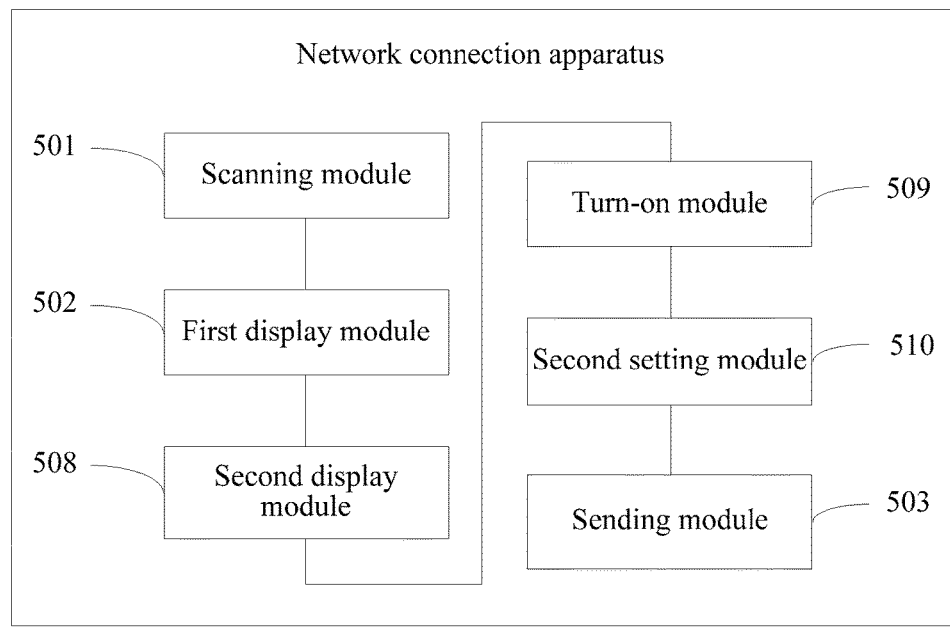
FIG. 7 is a schematic structural diagram of a third network connection apparatus according to some embodiments of the present application.

In a specific implementation, referring to FIG. 7, the apparatus further includes:

a second display module 508, configured to display a hotspot setting interface when a hotspot setting instruction is received;

a turn-on module 509, configured to turn on a hotspot after receiving a hotspot turn-on instruction based on the hotspot setting interface; and a second setting module 510, configured to set a hotspot identifier for the hotspot to the default wireless access point identifier and set a hotspot password for the hotspot to the default wireless access point password when the default wireless access point identifier and the default wireless access point password are detected from the hotspot setting interface.

Figure 8:
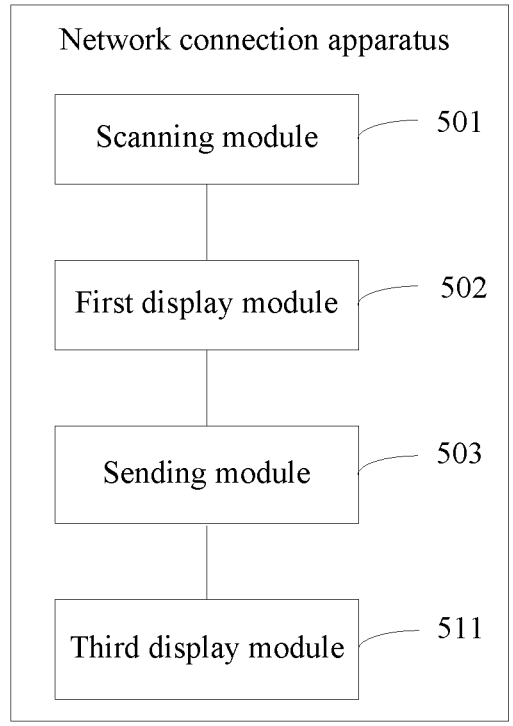
FIG. 8 is a schematic structural diagram of a fourth network connection apparatus according to some embodiments of the present application.

In a specific implementation, referring to FIG. 8, the apparatus further includes:

a third display module 511, configured to display prompt information of a connection failure after receiving connection failure information from the server, where the connection failure information is used for prompting that the user-specified intelligent device fails to connect to the target wireless access point.

In a specific implementation, the user-specified intelligent device is an intelligent device without a user input operation interface.

In this embodiment of the present application, when displaying the network connection interface based on the acquired graphic code, a configuration terminal may receive settings of the target wireless access point identifier and the target wireless access point password based on the network connection interface, and send the user-specified intelligent device identifier, the user-specified target wireless access point identifier, and the user-specified target wireless access point password to the server, so that the user-specified intelligent device may acquire the target wireless access point identifier and the target wireless access point password from the server and complete the network connection to the target wireless access point without turning on a monitoring mode, thereby improving the accuracy of the network connection established by the user-specified intelligent device.

Figure 9:
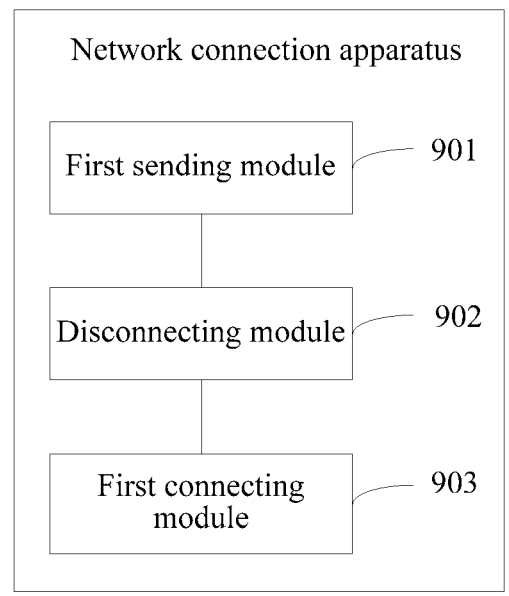
FIG. 9 is a schematic structural diagram of a fifth network connection apparatus according to some embodiments of the present application.

FIG. 9 is a schematic diagram of a network connection apparatus according to some embodiments of the present application. Referring to FIG. 9, the apparatus includes a first sending module 901, a disconnecting module 902, and a first connecting module 903.

The first sending module 901 is configured to send an acquisition request to a server, so that the server returns a target wireless access point identifier and a target wireless access point password based on a user-specified intelligent device identifier, the acquisition request carrying the user-specified intelligent device identifier, and a user-specified intelligent device being a device to connect to a target wireless access point.

The disconnecting module 902 is configured to disconnect from a currently connected network when the target wireless access point identifier and the target wireless access point password that are sent by the server are received.

The first connecting module 903 is configured to establish a network connection to the target wireless access point based on the target wireless access point identifier and the target wireless access point password.

Figure 10:
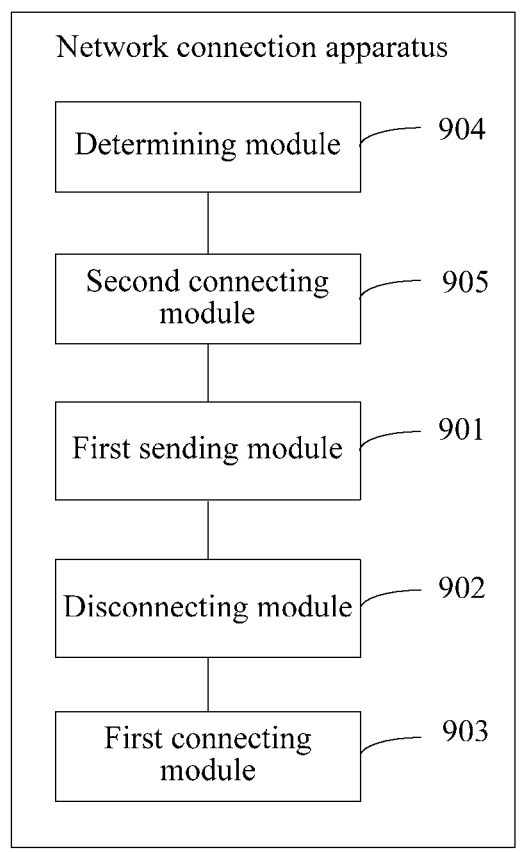
FIG. 10 is a schematic structural diagram of a sixth network connection apparatus according to some embodiments of the present application.

In a specific implementation, referring to FIG. 10, the apparatus further includes:

a determining module 904, configured to determine whether a network is connected currently; and a second connecting module 905, configured to establish a network connection based on a default wireless access point identifier and a default wireless access point password if the network is not connected currently, where the default wireless access point identifier is a built-in wireless access point identifier and the default wireless access point password is a password corresponding to the default wireless access point identifier.

In a specific implementation, the currently connected network includes a hotspot network of a configuration terminal.

Figure 11:
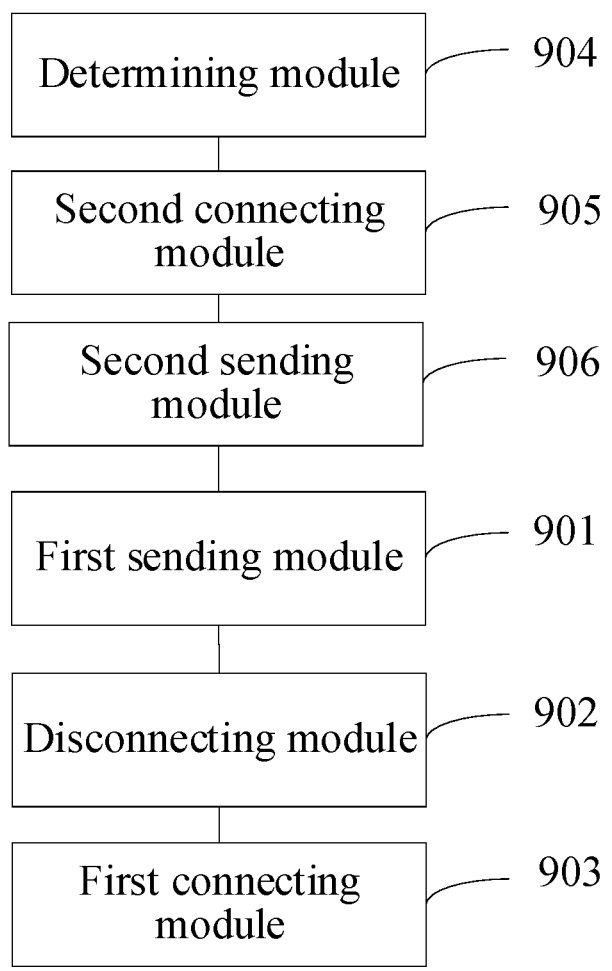
FIG. 11 is a schematic structural diagram of a seventh network connection apparatus according to some embodiments of the present application.

In a specific implementation, referring to FIG. 11, the apparatus further includes:

a second sending module 906, configured to send prompt information of a connection failure to the server when the network connection to the target wireless access point fails, so that the server sends the prompt information of connection failure to a configuration terminal.

In conclusion, in this embodiment of the present application, the user-specified intelligent device may send the acquisition request to the server to acquire the target wireless access point identifier and the target wireless access point password from the server and establish the network connection to the target wireless access point based on the target wireless access point identifier and the target wireless access point password without turning on a monitoring mode, thereby improving the accuracy of the network connection established by the user-specified intelligent device. Moreover, in this embodiment of the present application, the user-specified intelligent device does not need to switch between the monitoring mode and an ordinary mode, an operation is easy, and a requirement on a configuration of the user-specified intelligent device is relatively low, thereby improving an adaptation range of the network connection.

In the embodiments of the present application, if implemented in the form of software functional modules and sold or used as independent products, the integrated modules may be stored in a computer-readable storage medium. Based on such an understanding, persons skilled in the technology should understand that the embodiments of this application may be provided as methods, systems, or computer program products. Therefore, this application may take the form of total hardware embodiments, total software embodiments, or embodiments combining software and hardware. In addition, this application may use a form of a computer program product implemented on one or more computer available storage media including computer available program code. The storage media include, but are not limited to a U disk, a mobile hard disk, a read-only memory (ROM), a random access memory (RAM), a disk memory, a compact disc read-only memory (CD-ROM), an optical memory, and the like.

This application is described with reference to flowcharts and/or block diagrams of the method, the device (the system), and the computer program product in the embodiments of this application. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferable embodiments of this application have been described, once persons skilled in the technology know a basic creative concept, they can make other changes and modifications to these embodiments. Therefore, the following claims are intended to cover the preferred embodiments and all changes and modifications falling within the scope of this application.

Correspondingly, an embodiment of the present application further provides a computer storage medium storing a computer program, and the computer program is used for performing the network connection method in the embodiments of the present application.

Figure 12:
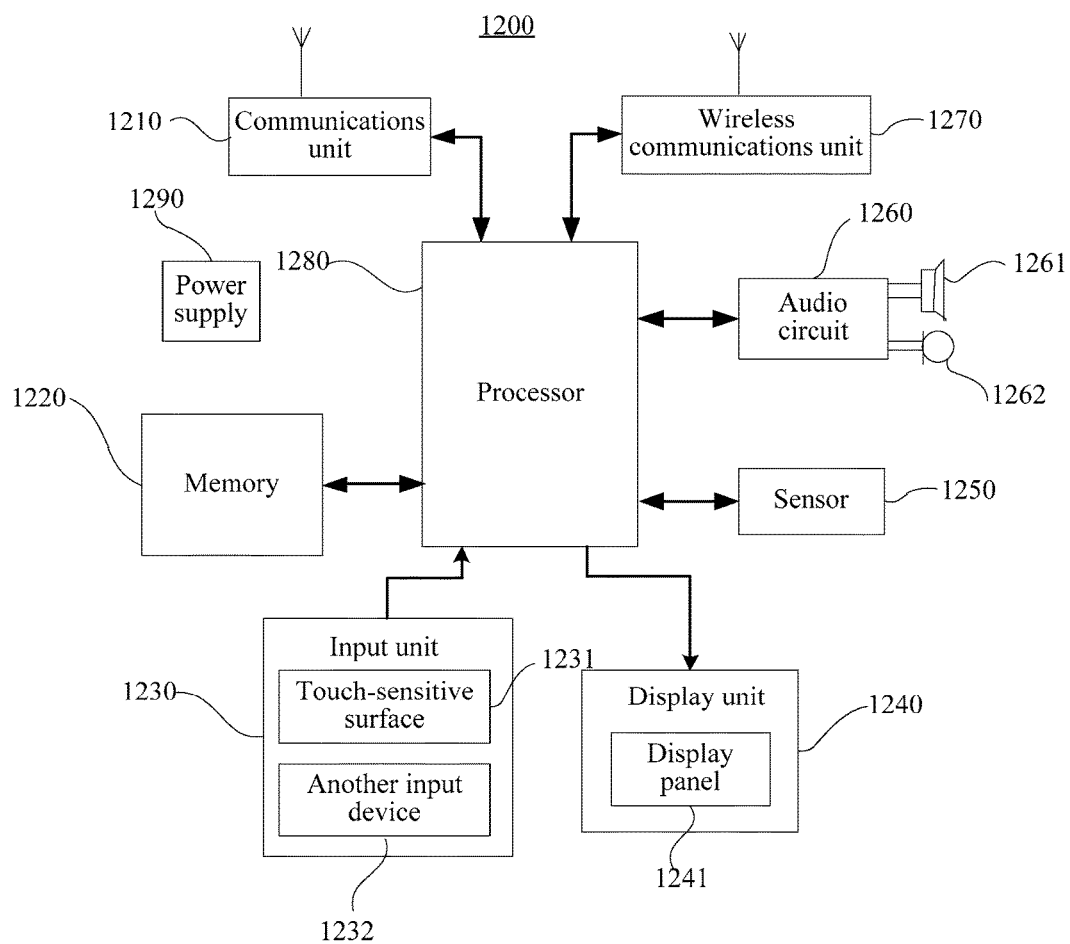
FIG. 12 is a schematic structural diagram of an eighth network connection apparatus according to some embodiments of the present application.

FIG. 12 is a schematic structural diagram of a network connection terminal according to some embodiments of the present application. A first user client in the foregoing embodiment of the present application may be installed in the terminal. Referring to FIG. 12, the terminal 1200 may include a communications unit 1210, a memory 1220 including one or more computer readable storage media, an input unit 1230, a display unit 1240, a sensor 1250, an audio circuit 1260, a Wireless Fidelity (Wi-Fi) module 1270, a processor 1280 including one or more processing cores, a power supply 1290, and the like. Persons skilled in the technology may understand that the structure of the terminal shown in FIG. 12 does not constitute a limitation to the terminal, and the terminal may include more or fewer components than those shown in the figure, or some components may be combined, or a different component deployment may be used.

The communications unit 1210 may be configured to receive and send signals during an information receiving and sending process or a call process. The communications unit 1210 may be a network communications device such as a radio frequency (RF) circuit, a router, or a modem. Particularly, when the communications unit 1210 is the RF circuit, the communications unit 1210 receives downlink information of a base station, and then hands over the downlink information to one or more processors 1280 for processing.

In addition, the communications unit 1210 sends related uplink data to the base station. Generally, the RF circuit as the communications unit includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the communications unit 1210 may further communicate with a network and other devices through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), an email, a short messaging service (SMS), and the like. The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 1220 may include a high speed random access memory, and may further include a non-volatile memory, such as at least one magnetic disk storage device, a flash memory, or other volatile solid-state storage devices. Correspondingly, the memory 1220 may further include a memory controller, to provide access of the processor 1280 and the input unit 1230 to the memory 1220.

The input unit 1230 may be configured to receive input digit or character information, and generate a keyboard, mouse, joystick, optical or track ball signal input related to the user setting and function control. Preferably, the input unit 1230 may include a touch-sensitive surface 1231 and another input device 1232. The touch-sensitive surface 1231, also referred to as a touchscreen or a touch panel, may collect a touch operation of a user on or near the touch-sensitive surface (such as an operation of a user on or near the touch-sensitive surface 1231 by using any suitable object or accessory, such as a finger or a stylus), and drive a corresponding connection apparatus according to a preset program. Optionally, the touch-sensitive surface 1231 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1280. Moreover, the touch controller can receive and execute a command sent by the processor 1280. In addition, the touch-sensitive surface 1231 may be a resistive, capacitive, infrared, or surface sound wave type touch-sensitive surface. In addition to the touch-sensitive surface 1231, the input unit 1230 may further include the another input device 1232. Preferably, the another input device 1232 may include, but is not limited to, one or more of a physical keyboard, a functional key (such as a volume control key and a switch key), a track ball, a mouse, and a joystick.

The display unit 1240 may be configured to display information input by the user or information provided for the user, and various graphical user interfaces of the terminal 1200. The graphical user interfaces may be composed of graphics, text, icons, videos, and any combination thereof. The display unit 1240 may include a display panel 1241. Optionally, the display panel 1241 may be configured by using a liquid crystal display (LCD), an organic light-emitting diode (OLED), or the like. Further, the touch-sensitive surface 1231 may cover the display panel 1241. After detecting a touch operation on or near the touch-sensitive surface 1231, the touch-sensitive surface 1231 transfers the touch operation to the processor 1280, to determine the type of the touch event. Then, the processor 1280 provides a corresponding visual output on the display panel 1241 according to the type of the touch event. Although, in FIG. 12, the touch-sensitive surface 1231 and the display panel 1241 are used as two separate parts to implement input and output functions, in some embodiments, the touch-sensitive surface 1231 and the display panel 1241 may be integrated to implement the input and output functions.

The terminal 1200 may further include at least one sensor 1250 such as an optical sensor, a motion sensor, and other sensors. The optical sensor may include an ambient light sensor and a proximity sensor, where the ambient light sensor may adjust luminance of the display panel 1241 according to the luminance of the ambient light, and the proximity sensor may switch off the display panel 1241 and/or backlight when the terminal 1200 is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal 1200 is not described herein again.

The audio circuit 1260, a speaker 1261, and a microphone 1262 may provide audio interfaces between the user and the terminal 1200. The audio circuit 1260 may transmit, to the speaker 1261, an electric signal that is converted from received audio data. The speaker 1261 converts the electric signal into a voice signal for outputting. On the other hand, the microphone 1262 converts a collected voice signal into an electric signal. The audio circuit 1260 receives the electric signal and converts it into audio data, and outputs the audio data to the processor 1280 for processing. Then the processor 1280 sends the audio data to another terminal by using the communications unit 1210, or outputs the audio data to the memory 1220 for further processing. The audio circuit 1260 may further include an earplug jack, to provide communication between a peripheral earphone and the terminal 1200.

To implement wireless communication, the terminal device may be configured with a wireless communications unit 1270, where the wireless communications unit 1270 may be a WiFi module. WiFi belongs to the short distance wireless transmission technology. The terminal 1200 may help, by using the wireless communications unit 1270, a user to receive and send an email, browse a web page, and access stream media, and the like, which provides wireless broadband Internet access for the user. Although the wireless communications unit 1270 is shown in the figure, it may be understood that, the wireless communications unit does not belong to a necessary constitution of the terminal 1200, and can be omitted within the scope of the essence of the present disclosure according to requirements.

The processor 1280 is a control center of the terminal 1200, which is connected to various parts of the entire mobile phone by using various interfaces and lines, and by running or executing a software program and/or module stored in the memory 1220 and calling data stored in the memory 1220, to perform various functions of the terminal 1200 and process data, so as to perform overall monitoring on the mobile phone. Optionally, the processor 1280 may include one or more processor cores. Preferably, the processor 1280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1280.

The terminal 1200 further includes the power supply 1290 (such as a battery) for supplying power to the components. Preferably, the power supply may be logically connected to the processor 1280 by using a power management system, thereby implementing functions such as charging, discharging, and power consumption management by using the power management system. The power supply 1290 may further include one or more of a direct current or alternating current power supply, a re-charging system, a power failure detection circuit, a power supply converter or inverter, a power supply state indicator, and any other component.

Although not shown in the figure, the terminal 1200 may further include a camera, a Bluetooth module, and the like, which are not described herein.

In this embodiment, the terminal further includes one or more programs. The one or more programs are stored in a memory, and are executed by one or more processors, and the one or more programs include instructions used for performing the following network connection method provided in the embodiments of the present application, including:

scanning a graphic code on a user-specified intelligent device after receiving a graphic code recognition instruction, the user-specified intelligent device being a device to connect to a target wireless access point;

displaying a network connection interface based on the acquired graphic code, the network connection interface being used for configuring a target wireless access point identifier and a target wireless access point password; and sending a user-specified intelligent device identifier, the user-specified target wireless access point identifier, and the user-specified target wireless access point password to a server after receiving a configuration completion instruction based on the network connection interface, so that the user-specified intelligent device acquires the user-specified target wireless access point identifier and the user-specified target wireless access point password from the server and establishes a network connection to the target wireless access point.

In a specific implementation, after the displaying a network connection interface based on the acquired graphic code, the method further includes:

determining whether a hotspot is currently turned on;

determining whether intelligent devices currently connected to the hotspot include the user-specified intelligent device if the hotspot is turned on;

acquiring a default wireless access point identifier and a default wireless access point password from the network connection interface if the user-specified intelligent device is not included, where the default wireless access point identifier is a wireless access point identifier built in the user-specified intelligent device and the default wireless access point password is a password corresponding to the default wireless access point identifier; and setting a hotspot identifier for the hotspot using the default wireless access point identifier and setting a hotspot password for the hotspot using the default wireless access point password.

In a specific implementation, after the displaying a network connection interface based on the acquired graphic code, the method further includes:

displaying a hotspot setting interface when a hotspot setting instruction is received;

turning on a hotspot after receiving a hotspot turn-on instruction based on the hotspot setting interface; and setting a hotspot identifier for the hotspot to the default wireless access point identifier and setting a hotspot password for the hotspot to the default wireless access point password when the default wireless access point identifier and the default wireless access point password are detected from the hotspot setting interface.

In a specific implementation, after the sending a user-specified intelligent device identifier, the user-specified target wireless access point identifier, and the user-specified target wireless access point password to a server, the method further includes:

displaying prompt information of a connection failure after receiving connection failure information from the server, where the connection failure information is used for prompting that the user-specified intelligent device fails to connect to the target wireless access point.

In a specific implementation, the user-specified intelligent device is an intelligent device without a user input operation interface.

In this embodiment of the present application, when displaying the network connection interface based on the acquired graphic code, a configuration terminal may receive settings of the target wireless access point identifier and the target wireless access point password based on the network connection interface, and send the user-specified intelligent device identifier, the user-specified target wireless access point identifier, and the user-specified target wireless access point password to the server, so that the user-specified intelligent device may acquire the target wireless access point identifier and the target wireless access point password from the server and complete the network connection to the target wireless access point without turning on a monitoring mode, thereby improving the accuracy of the network connection established by the user-specified intelligent device.

Figure 13:
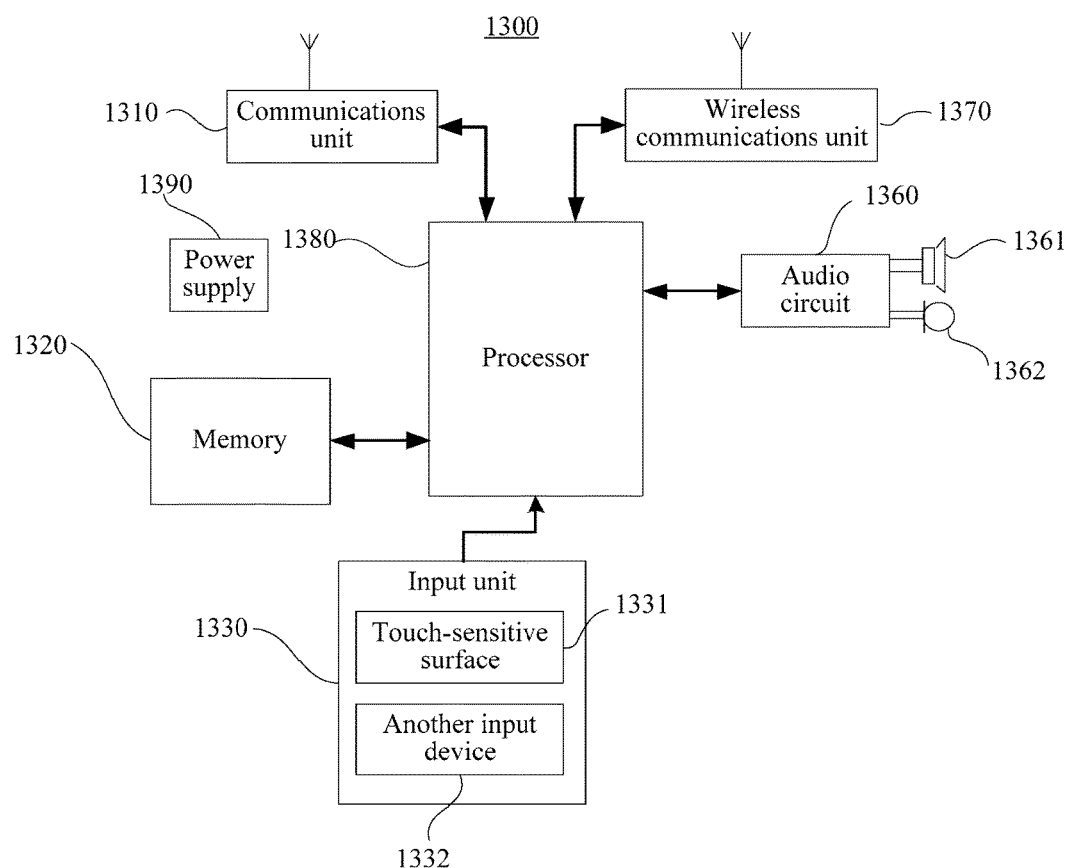
FIG. 13 is a schematic structural diagram of a ninth network connection apparatus according to some embodiments of the present application.

FIG. 13 is a schematic structural diagram of a network connection terminal according to some embodiments of the present application. The first user client in the foregoing embodiment of the present application may be installed in the terminal. Referring to FIG. 13, the terminal 1300 may include a communications unit 1310, a memory 1320 including one or more computer readable storage media, an input unit 1330, an audio circuit 1360, a Wireless Fidelity (WiFi) module 1370, a processor 1380 including one or more processing cores, and a power supply 1390, and the like. Persons skilled in the technology may understand that the structure of the terminal shown in FIG. 13 does not constitute a limitation to the terminal, and the terminal may include more or fewer components than those shown in the figure, or some components may be combined, or a different component deployment may be used.

The communications unit 1310 may be configured to receive and send signals during an information receiving and sending process or a call process. The communications unit 1310 may be a network communications device, such as a radio frequency (RF) circuit, a router, or a modem. Particularly, when the communications unit 1310 is the RF circuit, the communications unit 1310 receives downlink information of a base station, and then hands over the downlink information to one or more processors 1380 for processing. In addition, the communications unit 1310 sends related uplink data to the base station. Generally, the RF circuit as the communications unit includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the communications unit 1310 may further communicate with a network and other devices through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), an email, a short messaging service (SMS), and the like. The memory 1320 may be configured to store a software program and module. The processor 1380 runs the software program and module stored in the memory 1320, to implement various functional applications and data processing. The memory 1320 may mainly include a program storage area and a data storage area. The program storage area may store an operating system, an application program required by at least one function (such as a sound playback function and an image display function), and the like. The data storage area may store data (such as audio data and an address book) created according to use of the terminal 1300, and the like. In addition, the memory 1320 may include a high speed random access memory, and may further include a non-volatile memory, such as at least one magnetic disk storage device, a flash memory, or other volatile solid-state storage devices. Correspondingly, the memory 1320 may further include a memory controller, to provide access of the processor 1380 and the input unit 1330 to the memory 1320.

The input unit 1330 may be configured to receive input digit or character information, and generate a keyboard, a joystick, optical or track ball signal input related to the user setting and function control. Preferably, the input unit 1330 may include a touch-sensitive surface 1331 and another input device 1332. The touch-sensitive surface 1331, also referred to as a touchscreen or a touch panel, may collect a touch operation of a user on or near the touch-sensitive surface (such as an operation of a user on or near the touch-sensitive surface 1331 by using any suitable object or accessory, such as a finger or a stylus), and drive a corresponding connection apparatus according to a preset program. Optionally, the touch-sensitive surface 1331 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1380. Moreover, the touch controller can receive and execute a command sent by the processor 1380. In addition, the touch-sensitive surface 1331 may be a resistive, capacitive, infrared, or surface sound wave type touch-sensitive surface. In addition to the touch-sensitive surface 1331, the input unit 1330 may further include the another input device 1332. Preferably, the another input device 1332 may include, but is not limited to, one or more of a physical keyboard, a functional key (such as a volume control key and a switch key), a track ball, and a joystick.

The audio circuit 1360, a speaker 1361, and a microphone 1362 may provide audio interfaces between the user and the terminal 1300. The audio circuit 1360 may transmit, to the speaker 1361, an electric signal that is converted from received audio data. The speaker 1361 converts the electric signal into a voice signal for outputting. On the other hand, the microphone 1362 converts a collected voice signal into an electric signal. The audio circuit 1360 receives the electric signal and converts it into audio data, and outputs the audio data to the processor 1380 for processing. Then the processor 1280 sends the audio data to another terminal by using the communications unit 1310, or outputs the audio data to the memory 1320 for further processing. The audio circuit 1360 may further include an earplug jack, to provide communication between a peripheral earphone and the terminal 1300.

To implement wireless communication, the terminal device may be configured with a wireless communications unit 1370, where the wireless communications unit 1370 may be a WiFi module. WiFi belongs to the short distance wireless transmission technology. The terminal 1300 may help, by using the wireless communications unit 1370, a user to receive and send an email, browse a web page, and access stream media, and the like, which provides wireless broadband Internet access for the user. Although the wireless communications unit 1370 is shown in the figure, it may be understood that, the wireless communications unit does not belong to a necessary constitution of the terminal 1300, and can be omitted within the scope of the essence of the present disclosure according to requirements.

The processor 1380 is a control center of the terminal 1300, which is connected to various parts of the entire mobile phone by using various interfaces and lines, and by running or executing a software program and/or module stored in the memory 1320 and calling data stored in the memory 1320, to perform various functions of the terminal 1300 and process data, so as to perform overall monitoring on the mobile phone. Optionally, the processor 1380 may include one or more processor cores. Preferably, the processor 1380 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1380.

The terminal 1300 further includes the power supply 1390 (such as a battery) for supplying power to the components. Preferably, the power supply may be logically connected to the processor 1380 by using a power management system, thereby implementing functions such as charging, discharging, and power consumption management by using the power management system. The power supply 1390 may further include one or more of a direct current or alternating current power supply, a re-charging system, a power failure detection circuit, a power supply converter or inverter, a power supply state indicator, and any other component.

Although not shown in the figure, the terminal 1300 may further include a camera, a Bluetooth module, and the like, which are not described herein.

In this embodiment, the terminal further includes one or more programs. The one or more programs are stored in a memory, and are executed by one or more processors, and the one or more programs include instructions used for performing the following network connection method provided in the embodiments of the present application, including:

sending an acquisition request to a server, so that the server returns a target wireless access point identifier and a target wireless access point password based on a user-specified intelligent device identifier, the acquisition request carrying the user-specified intelligent device identifier, and a user-specified intelligent device being a device to connect to a target wireless access point;

disconnecting from a currently connected network when the target wireless access point identifier and the target wireless access point password that are sent by the server are received; and establishing a network connection to the target wireless access point based on the target wireless access point identifier and the target wireless access point password.

In a specific implementation, before the sending an acquisition request to a server, the method further includes:

determining whether a network is connected currently; and establishing a network connection based on a default wireless access point identifier and a default wireless access point password if the network is not connected currently, where the default wireless access point identifier is a built-in wireless access point identifier and the default wireless access point password is a password corresponding to the default wireless access point identifier.

In a specific implementation, the currently connected network includes a hotspot network of a configuration terminal.

In a specific implementation, after the establishing a network connection to the target wireless access point based on the target wireless access point identifier and the target wireless access point password, the method further includes:

sending prompt information of a connection failure to the server when the network connection to the target wireless access point fails, so that the server sends the prompt information of the connection failure to a configuration terminal.

In this embodiment of the present application, the user-specified intelligent device may send the acquisition request to the server to acquire the target wireless access point identifier and the target wireless access point password from the server and establish the network connection to the target wireless access point based on the target wireless access point identifier and the target wireless access point password without turning on a monitoring mode, thereby improving the accuracy of the network connection established by the user-specified intelligent device. Moreover, in this embodiment of the present application, the user-specified intelligent device does not need to switch between the monitoring mode and an ordinary mode, an operation is easy, and a requirement on a configuration of the user-specified intelligent device is relatively low, thereby improving an adaptation range of the network connection.

It should be noted that when the network connection apparatus provided in the foregoing embodiment connects to a network, it is illustrated with an example of division of the foregoing function modules. In practical application, the foregoing functions may be distributed to different function modules according to requirements, that is, the internal structure of the apparatus is divided into different function modules, so as to finish all or part of the functions described above. In addition, the network connection apparatus provided in the foregoing embodiments and the embodiments of the network connection methods belong to one concept. For specific implementation procedures, refer to the method embodiments, and details are not described herein again.

Persons of ordinary skill in the technology may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. A wireless network connection method performed by a mobile terminal having one or more processors and memory storing a plurality of programs to be executed by the one or more processors, the method comprising:

acquiring, by the mobile terminal, a graphic code displayed on a user-specified intelligent device after receiving a graphic code recognition instruction, the user-specified intelligent device being a device to connect to a target wireless access point;

displaying, by the mobile terminal, a network connection interface based on the acquired graphic code, the network connection interface being used for configuring a target wireless access point identifier and a target wireless access point password;

receiving, by the mobile terminal, a configuration completion instruction through the network connection interface, the configuration completion instruction including a user-specified target wireless access point identifier and a user-specified target wireless access point password; and sending, by the mobile terminal, (i) the user-specified target wireless access point identifier and the user-specified target wireless access point password to the user-specified intelligent device, and sending, by the mobile terminal, (ii) a user-specified intelligent device identifier, the user-specified target wireless access point identifier, and the user-specified target wireless access point password to a server for storage, respectively, so that the user-specified intelligent device acquires the user-specified target wireless access point identifier and the user-specified target wireless access point password from the mobile terminal and establishes a network connection to the target wireless access point.

2. The method according to claim 1, wherein the graphic code is a two-dimensional code or a barcode and the user-specified intelligent device is one selected from the group consisting of an intelligent camera, an intelligent speaker, an intelligent television, and an intelligent air conditioner.

3. The method according to claim 1, further comprising:
after the mobile terminal displaying a network connection interface based on the acquired graphic code:
determining, by the mobile terminal, whether a hotspot is currently turned on;

determining, by the mobile terminal, whether the user-specified intelligent device is one of intelligent devices currently connected to the hotspot when the hotspot is turned on;
acquiring, by the mobile terminal, a default wireless access point identifier and a default wireless access point password from the network connection interface if the user-specified intelligent device is not comprised, wherein the default wireless access point identifier is a wireless access point identifier built in the user-specified intelligent device and the default wireless access point password is a password corresponding to the default wireless access point identifier; and
setting, by the mobile terminal, a hotspot identifier for the hotspot using the default wireless access point identifier and setting, by the mobile terminal, a hotspot password for the hotspot using the default wireless access point password.

4. The method according to claim 1, further comprising:
after the mobile terminal displaying a network connection interface based on the acquired graphic code:
turning on, by the mobile terminal, a hotspot after receiving a hotspot turn-on instruction based on the network connection interface;
detecting, by the mobile terminal, a default wireless access point identifier and a default wireless access point password from the network connection interface; and
setting, by the mobile terminal, a hotspot identifier for the hotspot to the default wireless access point identifier and setting, by the mobile terminal, a hotspot password for the hotspot to the default wireless access point password.

5. The method according to claim 4, further comprising:
after the mobile terminal sending a user-specified intelligent device identifier, the user-specified target wireless access point identifier, and the user-specified target wireless access point password to a server:
receiving, by the mobile terminal, connection success information from the server;
turning off, by the mobile terminal, the hotspot in response to the connection success information.

6. The method according to claim 1, further comprising:
after the mobile terminal sending a user-specified intelligent device identifier, the user-specified target wireless access point identifier, and the user-specified target wireless access point password to a server:
displaying prompt information of a connection failure after receiving connection failure information from the server, wherein the connection failure information is used for prompting that the user-specified intelligent device fails to connect to the target wireless access point.

7. The method according to claim 1, wherein the user-specified intelligent device is an intelligent device without a user input operation interface.

8. A mobile terminal for establishing a wireless network connection, the mobile terminal comprising one or more processors, memory coupled to the one or more processors, and a plurality of programs stored in the memory that, when executed by the one or more processors, cause the mobile terminal to perform operations including:
acquiring, by the mobile terminal, a graphic code displayed on a user-specified intelligent device after receiving a graphic code recognition instruction, the user-specified intelligent device being a device to connect to a target wireless access point;
displaying, by the mobile terminal, a network connection interface based on the acquired graphic code, the network connection interface being used for configuring a target wireless access point identifier and a target wireless access point password;
receiving, by the mobile terminal, a configuration completion instruction through the network connection interface, the configuration completion instruction including a user-specified target wireless access point identifier and a user-specified target wireless access point password; and
sending, by the mobile terminal, (i) the user-specified target wireless access point identifier and the user-specified target wireless access point password to the user-specified intelligent device, and sending, by the mobile terminal, (ii) a user-specified intelligent device identifier, the user-specified target wireless access point identifier, and the user-specified target wireless access point password to a server for storage, respectively, so that the user-specified intelligent device acquires the user-specified target wireless access point identifier and the user-specified target wireless access point password from the mobile terminal and establishes a network connection to the target wireless access point.

9. The mobile terminal according to claim 8, wherein the graphic code is a two-dimensional code or a barcode and the user-specified intelligent device is one selected from the group consisting of an intelligent camera, an intelligent speaker, an intelligent television, and an intelligent air conditioner.

10. The mobile terminal according to claim 8, wherein the operations further comprise:
after the mobile terminal displaying a network connection interface based on the acquired graphic code:
determining, by the mobile terminal, whether a hotspot is currently turned on;
determining, by the mobile terminal, whether the user-specified intelligent device is one of intelligent devices currently connected to the hotspot when the hotspot is turned on;
acquiring, by the mobile terminal, a default wireless access point identifier and a default wireless access point password from the network connection interface if the user-specified intelligent device is not comprised, wherein the default wireless access point identifier is a wireless access point identifier built in the user-specified intelligent device and the default wireless access point password is a password corresponding to the default wireless access point identifier; and
setting, by the mobile terminal, a hotspot identifier for the hotspot using the default wireless access point identifier and setting, by the mobile terminal, a hotspot password for the hotspot using the default wireless access point password.

11. The mobile terminal according to claim 8, wherein the operations further comprise:
after the mobile terminal displaying a network connection interface based on the acquired graphic code:
turning on, by the mobile terminal, a hotspot after receiving a hotspot turn-on instruction based on the network connection interface;

detecting, by the mobile terminal, a default wireless access point identifier and a default wireless access point password from the network connection interface; and setting, by the mobile terminal, a hotspot identifier for the hotspot to the default wireless access point identifier and setting, by the mobile terminal, a hotspot password for the hotspot to the default wireless access point password.

12. The mobile terminal according to claim 11, wherein the operations further comprise:

after the mobile terminal sending a user-specified intelligent device identifier, the user-specified target wireless access point identifier, and the user-specified target wireless access point password to a server:
receiving, by the mobile terminal, connection success information from the server;
turning off, by the mobile terminal, the hotspot in response to the connection success information.

13. The mobile terminal according to claim 8, wherein the operations further comprise:

after the mobile terminal sending a user-specified intelligent device identifier, the user-specified target wireless access point identifier, and the user-specified target wireless access point password to a server:
displaying prompt information of a connection failure after receiving connection failure information from the server, wherein the connection failure information is used for prompting that the user-specified intelligent device fails to connect to the target wireless access point.

14. The mobile terminal according to claim 8, wherein the user-specified intelligent device is an intelligent device without a user input operation interface.

15. A non-transitory computer readable storage medium storing a plurality of programs that, when executed by one or more processors of a mobile terminal, cause the mobile terminal to perform operations including:

acquiring, by the mobile terminal, a graphic code displayed on a user-specified intelligent device after receiving a graphic code recognition instruction, the user-specified intelligent device being a device to connect to a target wireless access point;

displaying, by the mobile terminal, a network connection interface based on the acquired graphic code, the network connection interface being used for configuring a target wireless access point identifier and a target wireless access point password;

receiving, by the mobile terminal, a configuration completion instruction through the network connection interface, the configuration completion instruction including a user-specified target wireless access point identifier and a user-specified target wireless access point password; and sending, by the mobile terminal, (i) the user-specified target wireless access point identifier and the user-specified target wireless access point password to the user-specified intelligent device, and sending, by the mobile terminal, (ii) a user-specified intelligent device identifier, the user-specified target wireless access point identifier, and the user-specified target wireless access point password to a server for storage, respectively, so that the user-specified intelligent device acquires the user-specified target wireless access point identifier and the user-specified target wireless access point password from the mobile terminal and establishes a network connection to the target wireless access point.

16. The non-transitory computer readable storage medium according to claim 15, wherein the graphic code is a two-dimensional code or a barcode and the user-specified intelligent device is one selected from the group consisting of an intelligent camera, an intelligent speaker, an intelligent television, and an intelligent air conditioner.

17. The non-transitory computer readable storage medium according to claim 15, wherein the operations further comprise:

after the mobile terminal displaying a network connection interface based on the acquired graphic code:
determining, by the mobile terminal, whether a hotspot is currently turned on;
determining, by the mobile terminal, whether the user-specified intelligent device is one of intelligent devices currently connected to the hotspot when the hotspot is turned on;
acquiring, by the mobile terminal, a default wireless access point identifier and a default wireless access point password from the network connection interface if the user-specified intelligent device is not comprised, wherein the default wireless access point identifier is a wireless access point identifier built in the user-specified intelligent device and the default wireless access point password is a password corresponding to the default wireless access point identifier; and
setting, by the mobile terminal, a hotspot identifier for the hotspot using the default wireless access point identifier and setting, by the mobile terminal, a hotspot password for the hotspot using the default wireless access point password.

18. The non-transitory computer readable storage medium according to claim 15, wherein the operations further comprise:

after the mobile terminal displaying a network connection interface based on the acquired graphic code:
turning on, by the mobile terminal, a hotspot after receiving a hotspot turn-on instruction based on the network connection interface;
detecting, by the mobile terminal, a default wireless access point identifier and a default wireless access point password from the network connection interface; and
setting, by the mobile terminal, a hotspot identifier for the hotspot to the default wireless access point identifier and setting, by the mobile terminal, a hotspot password for the hotspot to the default wireless access point password.

19. The non-transitory computer readable storage medium according to claim 18, wherein the operations further comprise:

after the mobile terminal sending a user-specified intelligent device identifier, the user-specified target wireless access point identifier, and the user-specified target wireless access point password to a server:
receiving, by the mobile terminal, connection success information from the server;
turning off, by the mobile terminal, the hotspot in response to the connection success information.

20. The non-transitory computer readable storage medium according to claim 15, wherein the operations further comprise:

after the mobile terminal sending a user-specified intelligent device identifier, the user-specified target wireless access point identifier, and the user-specified target wireless access point password to a server:

displaying prompt information of a connection failure after receiving connection failure information from the server, wherein the connection failure information is used for prompting that the user-specified intelligent device fails to connect to the target wireless access point.

* * * * *